No. 679,036. Patented July 23, 1901.
E. LE R. RYER.
OPHTHALMOSCOPE.
(Application filed May 14, 1901.)
(No Model.) 3 Sheets—Sheet 1.
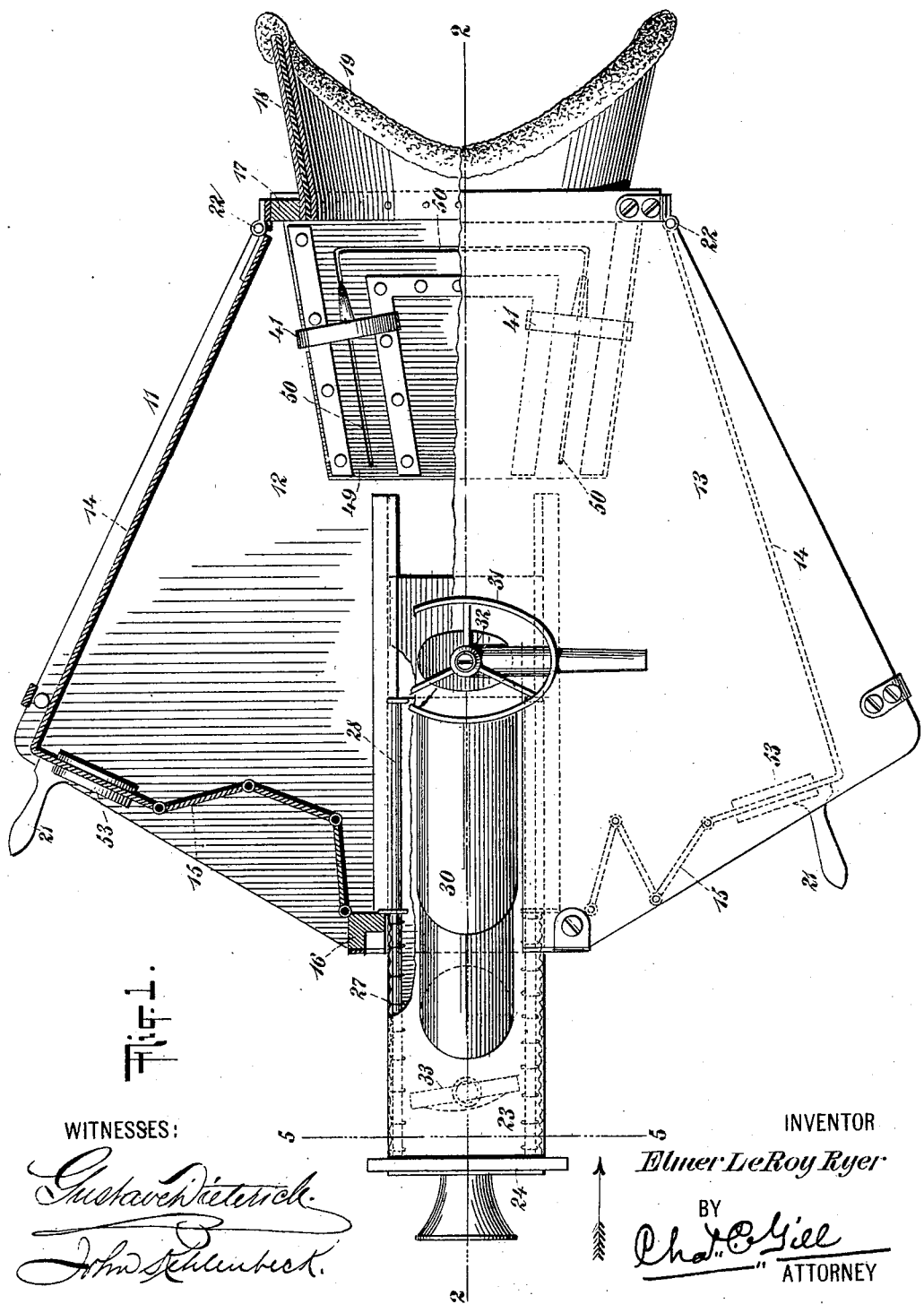
INVENTOR
Elmer LeRoy Ryer
BY
Chas. E. Gill
ATTORNEY

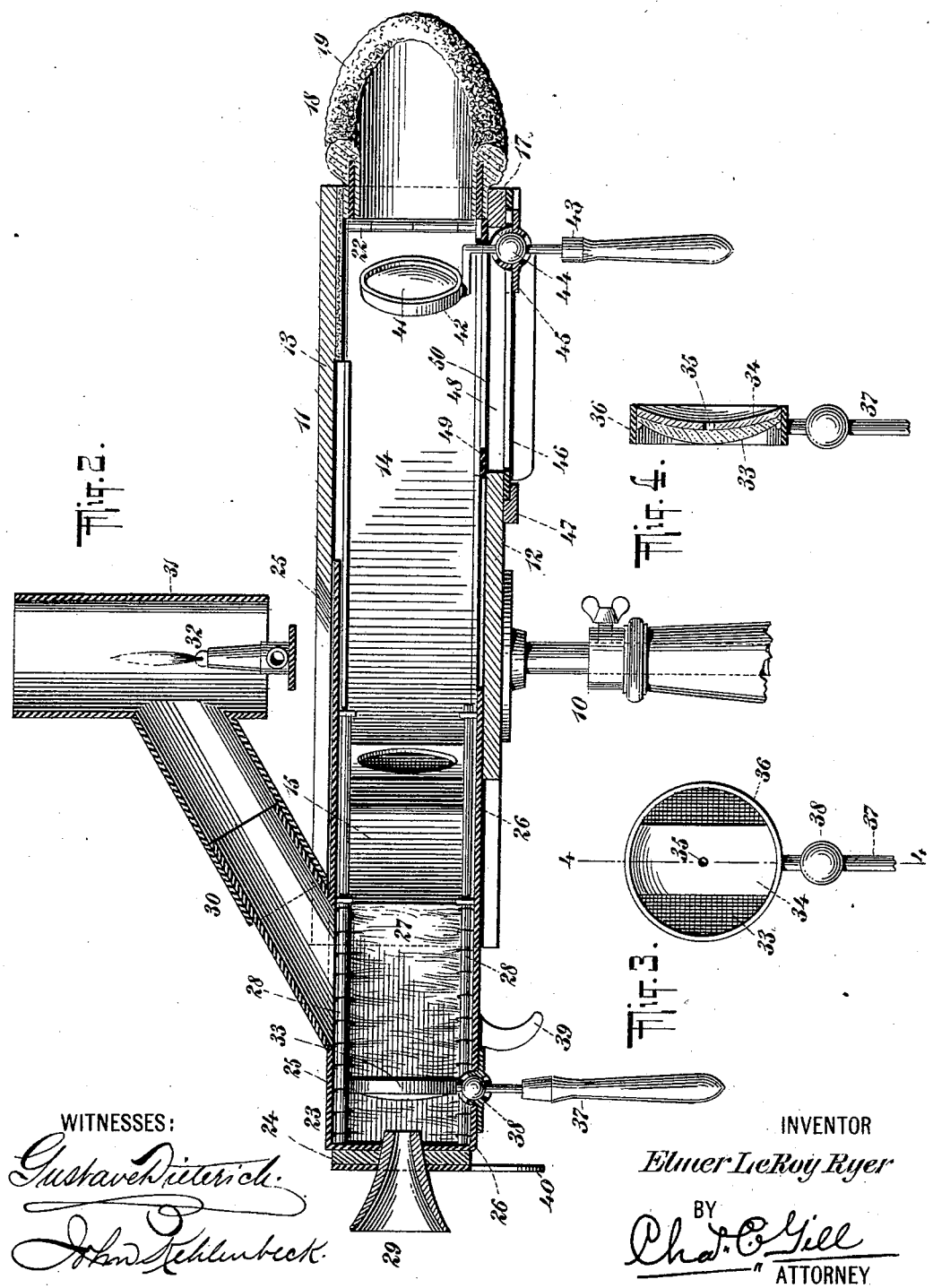

No. 679,036. Patented July 23, 1901.
E. LE R. RYER.
OPHTHALMOSCOPE.
(Application filed May 14, 1901.)
(No Model.) 3 Sheets—Sheet 3.

WITNESSES:
Gustave Dieterich
John Schlembeck

INVENTOR
Elmer LeRoy Ryer
BY
Chas. C. Gill
ATTORNEY.

UNITED STATES PATENT OFFICE.

ELMER LE ROY RYER, OF NEW YORK, N. Y.

OPHTHALMOSCOPE.

SPECIFICATION forming part of Letters Patent No. 679,036, dated July 23, 1901.

Application filed May 14, 1901. Serial No. 60,147. (No model.)

*To all whom it may concern:*

Be it known that I, ELMER LE ROY RYER, a citizen of the United States, and a resident of New York city, in the county of New York and State of New York, have invented certain new and useful Improvements in Ophthalmoscopes, of which the following is a specification.

The invention relates to improvements in ophthalmoscopes; and it consists in the novel features, structure, arrangement, and combinations of parts hereinafter described, and particularly pointed out in the claims.

The object of my invention is to produce a thoroughly-efficient instrument by which in accordance with the indirect method the eyes may be examined, and in carrying out my invention in its preferred embodiment I have constructed an instrument having at one end a guard or hood to receive the eyes of the patient and at the other end an eyepiece for the operator, while within the casing of the instrument and intermediate the eyepiece for the operator and the hood for the patient there is formed a dark chamber and provided a convex lens adjacent to the outer end of the instrument and an ophthalmoscopic lens adjacent to the operator's end of the instrument having an apertured mirror. Above the instrument is provided a light chamber with a connection leading to the aforesaid mirror, whereby the latter is enabled to reflect the rays of artificial light into the eye of the patient for the purpose of lighting up the fundus of same and enabling the operator to see the image thereof on the said convex lens, said image being due to the rays of light proceeding from the examined eye. The said dark chamber will be provided with dark windows through which the patient may look for a distance of twenty or more feet, so that the muscles of accommodation may be relaxed and the eye examined under proper conditions. In the preferred embodiment of the invention I shall have the darkened windows movable on radial lines, so that the operator may by moving said windows, with the patient's eye directed through the same, cause the eye to turn for a more full and complete examination thereof.

The invention will be fully understood from the detailed description hereinafter presented, reference being had to the accompanying drawings, in which—

Figure 5:
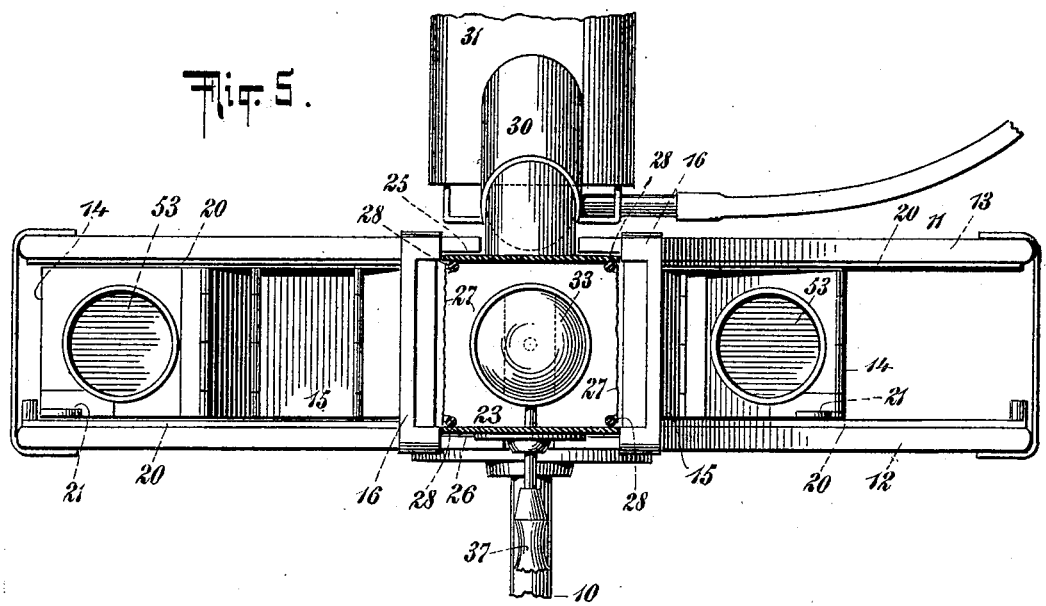
Figure 6:
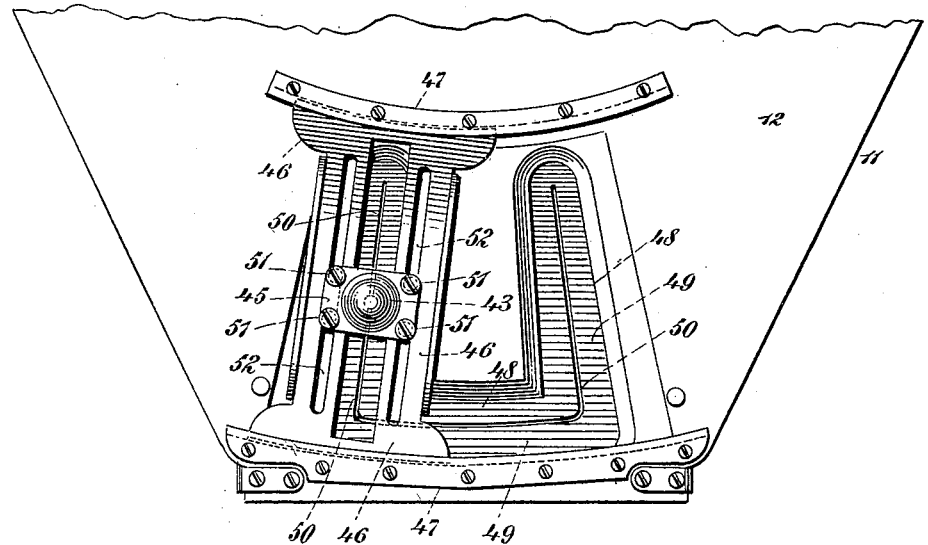

Figure 1 is a top view, partly broken away and partly in section, of an ophthalmoscope constructed in accordance with and embodying the invention, about one-half of the top of the casing of the instrument being in this figure broken away, so as to more fully disclose the interior construction. Fig. 2 is a central vertical longitudinal section of same on the dotted line 2 2 of Fig. 1. Fig. 3 is a detached elevation of the ophthalmoscopic lens carrying the mirror having a small spy-hole therein. Fig. 4 is a vertical section of same on the dotted line 4 4 of Fig. 3. Fig. 5 is a front elevation, partly in section, of the ophthalmoscope, the section being on the dotted line 5 5 of Fig. 1; and Fig. 6 is a bottom view of the rear portion of the instrument, this view being presented to illustrate more clearly the means provided for shifting the objective lens from one eye to the other of the patient and for enabling the adjustment of the said lens toward and from each eye of the patient.

The instrument will be mounted upon any suitable support 10, and the parts of the instrument are carried by a casing or frame 11, the latter being composed of a bottom plate 12, a top plate 13, corresponding in outline with the plate 11, hinged sides 14 14, and front collapsible ends 15 15, said collapsible ends 15 being at their inner adjoining ends hinged to a frame 16, Figs. 1 and 5, and at their outer ends connected with the said sides 14 14. At the outer end of the casing or frame 11 is a rigid frame 17, to which is secured the guard 18 to inclose the eyes of the patient, said guard 18 being fitted to the contour of the upper portion of a human face and edged with soft material 19 for the comfort of the patient and to aid in excluding the light of the room from the eyes of the patient. The upper surface of the lower plate 12 and the lower surface of the upper plate 13 will be covered with soft material, (designated in Fig. 5 by the numeral 20,) so as to exclude the light from entering along the edges of the sides 14 and collapsible ends 15, my purpose being that the chamber formed within the casing 11 by the plates 12 13, sides 14, and ends 15 shall be a dark chamber and constitute a substitute for the present dark room in which the eyes of patients are examined. The sides 14 are provided with handles 21 for the convenience of the operator in moving said sides inward or outward on their hinges 22, the latter serving as pivotal points and permitting the sides 14 to be adjusted on radial lines toward and from the longitudinal center of the casing 11. During the adjustment of the sides 14 toward and from the longitudinal center of the instrument the front ends 15 will collapse to a greater or less extent and permit the movement of the sides 14 without interfering with the dark condition of the chamber formed within the casing 11.

At the central portion of the front end of the instrument is provided a tube 23, which is shown as being rectangular in cross-section and composed of a solid front end 24, top and bottom plates 25 26, and flexible or cloth vertical sides 27, the cloth sides 27 being secured at their upper and lower edges upon interior rods 28, while at their outer ends the said cloth sides 27 are secured to the front end piece 24, and at their inner ends said cloth sides are secured to the edges of the frame 16. The tube 23 is adapted to be moved inward and outward, the upper and lower plates 25 26 sliding between the top and bottom plates 12 13 of the casing 11 and through the frame 16. In Fig. 1 the tube 23 is shown in its outer position, and when said tube is moved inward the cloth sides 27 collapse or furl up. The purpose of using the cloth sides 27 in lieu of rigid sides is in order that the said sides, when the tube 23 is adjusted inward, will not project into the dark chamber formed by the casing 11, where they might interfere with the proper examination of the eyes of the patient by the operator.

At the outer end of the tube 23 is provided the eyepiece 29, of usual form, through which the operator will look while examining the eyes of a patient. At the upper side of the tube 23 is secured the tube 30, in sections for purposes of adjustment and leading downward from the light chamber 31, in which will be placed a burner 32 or other means for creating artificial light. The upper end of the tube 30 opens into the chamber 31, and the lower end of the tube 30 opens into the upper side of the tube 23, so that the light from the chamber 31 may pass within the tube 23. Within the tube 23 is placed the ophthalmoscopic lens 33, (shown in detail in Figs. 3 and 4,) having upon its concave face the mirror 34, the latter having at its center the small aperture 35, through which the operator must look while examining the eyes of the patient. The mirror 34 is cemented upon the lens 33. In the present instance the mirror 34 is in the form of a strip extending vertically across the lens 33, and when thus arranged that portion of the face of the lens at the opposite sides of the mirror 34 should preferably be blackened, since it is only that part of the lens 33 in line with the opening 35 in the mirror 34 which is used by the operator. The lens 33 will be mounted in a suitable rim or frame 36, having a handle 37 and secured within the tube 23 by a ball-joint connection 38, so that the operator may twist or turn or tilt the lens 33 and mirror 34 in any manner he may desire within the proper limits allowed for the examination of the eyes. The mirror 34 is located to the front of the tube 30 in proper position to transmit the rays of light coming through the tube 30 to the eyes of the patient located at the hood or guard 18. The tube 23 therefore carries the eyepiece 29, the ophthalmoscopic lens 33 and mirror 34, the light-tube 30, light chamber 31, and burner 32, and said tube 23 may be adjusted inward or outward in accordance with the conditions met in the examination of eyes. I provide a finger-piece 39 and thumb-piece 40, Fig. 2, for the convenience of the operator in moving or adjusting the tube 23.

Within the outer portion of the chamber formed within the casing 11 is provided the convex objective lens 41, the same being held by a frame 42, having a handle 43 and secured by a ball-joint connection 44 to a carriage 45, Fig. 6, which is carried by a radial plate 46, whose ends are mounted in segmental guides 47 47, secured to the lower surface of the casing 11. The bottom plate 12 of the casing 11 is cut away, as at 48, and over the opening thus formed is applied the cloth covering 49, containing a slit 50, through which the stem of the handle 43 passes. When the radial plate 46 is in the position in which it is shown in Fig. 6, the carriage 45 may be adjusted toward or from the eye being examined, said carriage 45 at such time sliding along the plate 46, while the upper portion or stem of the handle 43 for the lens 41 is moving along the slit 50 in the cloth 49 above the plate 46. The carriage 45 is guided in its movement lengthwise of the plate 46 by means of the pins or screws 51 and the walls of the slots 52, cut in the plate 46. The plate 46 will remain in the position in which it is shown in Fig. 6 during all of the time that one eye of the patient is being examined, and during such examination of the said eye the lens 41 may be moved toward or from the eye, as well as twisted and turned within proper limits. When the other eye of the patient is to be examined, the operator will move the carriage 45 to the outer end of the plate 46 and then move the plate 46, with said carriage, in a transverse direction until said plate is below the other member of the cut-out portion 48. (Shown at the right-hand side of Fig. 6.) The plate 46 when shifted transversely is controlled in its movement by the guides 47, and when moved from its one position shown in Fig. 6 to its other position over the other or right-hand member of the cut-out portion 48, Fig. 6, the lens 41 will then be in line with the other eye of the patient, and it may be moved toward and from said eye at will, the slit 50 in the cloth 49 permitting of the movement of the handle 43 of the lens 41 without allowing the light to enter within the chamber formed by the casing 11. The plate 46 constitutes a means for sustaining the carriage 45 and lens 41 for adjusting the lens 41 toward and from the eye of the patient and for transferring the lens 41 from one to the other eye of the patient. The shifting of the plate 46 from left to right and back again is accomplished simply from the handle 43 of the lens 41, and said handle is always moved to the outer end of the plate 46 before shifting said plate from right to left or left to the right, so that the upper portion of the handle may follow along the transverse portion of the slit 50 in the cloth guard 49. The employment of the plate 46 and carriage 45 for the lens 41 enables me to examine each eye with the one lens without requiring any change in the position of the patient, both eyes of the patient remaining concealed within the guard or hood 18.

In the employment of the instrument made the subject hereof the eyes of the patient will be protected by the guard or shield 18 and directed into the chamber formed within the casing. The operator will adjust the relation of the light chamber 31 to the mirror 34 and the relation of the mirror 34 and lens 41 in respect to one another and the eyes to be examined, as well as to meet the condition of his own eyes at will, and during the examination of the eyes of the patient the operator may continue to move and adjust the lenses 33 and 41 to meet the conditions imposed. An important feature of the instrument is that the patient's eyes are directed into the dark chamber formed within the casing 11 and that at the front end of the said chamber are provided the dark glasses or windows 53, through which the patient may look at an object some twenty feet or more away, but which will not admit enough light within the said chamber to interfere with the proper examination of the eyes of the patient. The dark windows 53 allow the relaxation of the muscles of accommodation in the eyes of the patient, and hence enable the eyes of the patient to get into that normal condition so necessary for their proper and intelligent examination. The dark windows 53 also enable the patient to keep his eyes from the light reflected by the mirror 34, which is an important consideration, since if the eyes of the patient are affected by the reflected light they will cease to be normal and there would be no relaxation of the muscles of accommodation. A further important result which may be accomplished with the use of the dark windows 53, in connection with the hinged sides 14, is that while the eye of the patient is undergoing examination the operator, by gradually moving the side 14 on a radial line, will cause the patient's eye to turn in one direction and the other while following the dark window 53, the result of which is that the operator will be enabled with the eye under normal conditions to fully examine the fundus. It is evident that should the sides 14 be rigidly secured the dark windows 53 would be of great importance; but when the movable dark windows 53 are employed the value of the windows 53 is increased. Both eyes of the patient are at the same time held within the guard or hood 18, and the eye at the right-hand side of the hood 18 will look at the dark window 53 at the left-hand side of the casing and likewise the eye at the left-hand side of the hood 18 will look at the dark window 53 at the right-hand side of the casing 11, this having the effect of causing the eye to be turned to the limited extent requisite for its proper examination.

The lenses 41 and 33 will be put on a line with each other and with the eye under examination, the ball-joint mounting of said lenses permitting this to be done, and the operator will see reflected on the lens 41 the image for which he is seeking and which will enable him to determine the condition of the eye, this method of examining the eye being the indirect method. The rays of light proceeding from the examined eye pass through the lens 41 and form thereon the image of the fundus, and the operator looking through the aperture 35 in the mirror 34 can see this image and discover thereby such conditions as may be denoted or rendered visible.

I do not limit my invention and claims in every instance to the actual face-to-face contact of the lens 33 and mirror 34; but greater convenience and efficiency may be attained when the mirror 34 is directly affixed on the lens 33, as shown, since then the said parts are not only secured in rigid relation to one another, but the observation-aperture in the mirror is brought close against the lens, and any tilting or turning of the lens and mirror during an examination of the eye will not so readily tend to interfere with the operator in looking through said aperture as would be the case if the observation-aperture were some little distance away from the lens. There is also a convenience in having both lens and mirror carried by one support in a compact manner. The lens and mirror, whether or not in face-to-face contact and whether or not carried by a single support, are always at the operator's end of the instrument, while the convex or objective lens to receive the image of the fundus is always adjacent to the patient's end of the instrument.

The lenses 33 and 41 are in themselves known lenses in this art. The lens 41 is a convex lens or, as it is sometimes called, a "biconvex" lens, and it does not serve the purpose of a glass to enlarge objects, but acts by causing the luminous rays emanating from the eye to converge to bring or form near the focus of said rays an inverted aerial image of the fundus. The lens 33 is simply to relieve the operator's accommodation.

What I claim as my invention, and desire to secure by Letters Patent, is—

1. In an instrument for the examination of the eyes, a suitable support, and the casing adapted at its inner end for the operator and at its outer end for the eye to be examined, combined with the objective lens adjacent to the outer end of said casing, the lens and apertured mirror adjacent to the inner end of said casing, and means for supplying light to said mirror for reflection to the eye under examination; substantially as set forth.

2. In an instrument for the examination of the eyes, a suitable support, the casing having at its inner end an adjustable section adapted for the operator and containing the lens and apertured mirror, and light-supply means for coöperation with said mirror, said lens being mounted on a free bearing so that the operator may incline or move the same as may be required, combined with the objective lens adjacent to the outer end of the casing, the shield at the outer end of the casing for the eye to be examined, and means for adjusting said objective lens toward and from said eye; substantially as set forth.

3. In an instrument for the examination of the eyes, the casing adapted at its inner end for the operator and at its outer end for both eyes of the patient, combined with the objective lens adjacent to the outer end of said casing, means for permitting the adjustment of said lens to alinement with each of said eyes and toward and from each eye, the lens and apertured mirror adjacent to the inner end of said casing, and means for supplying light to said mirror for reflection to the eye under examination; substantially as set forth.

4. In an instrument for the examination of the eyes, the casing forming a dark chamber and adapted at its inner end for the operator and at its outer end for the eye to be examined, and said chamber having a darkened window through which the eye under examination may look at a distant object, combined with the objective lens adjacent to the outer end of said casing, the lens and apertured mirror adjacent to the inner end of said casing, and means for supplying light to said mirror for reflection to the eye under examination; substantially as set forth.

5. In an instrument for the examination of the eyes, the casing forming a dark chamber and adapted at its inner end for the operator and at its outer end for the eye to be examined, and said chamber having a movable darkened window through which the eye under examination may look at a distant object and which may be moved so as to direct the turning of the eye pending its examination, combined with the objective lens adjacent to the outer end of said casing, the lens and apertured mirror adjacent to the inner end of said casing, and means for supplying light to said mirror for reflection to the eye under examination; substantially as set forth.

6. In an instrument for the examination of the eyes, the casing forming a dark chamber and having at its inner end an eyepiece for the operator and at its outer end a shield for the eyes of the patient, and said chamber having a darkened window at each side of the said eyepiece for the use of the patient, combined with the objective lens adjacent to the outer end of said casing, the lens and apertured mirror adjacent to the inner end of said casing, and means for supplying light to said mirror for reflection to the eye under examination; substantially as set forth.

7. In an instrument for the examination of the eyes, the casing forming a dark chamber and having an eyepiece at its inner end for the operator, the shield for the eyes of the patient at its outer end, the hinged sides, and the collapsible front end portions having the darkened windows for the use of the patient, combined with the objective lens adjacent to the outer end of said casing, the lens and apertured mirror adjacent to the inner end of said casing, and means for supplying light to said mirror for reflection to the eye under examination; substantially as set forth.

8. In an instrument for the examination of the eyes, the lens having affixed thereon the mirror containing the observation-aperture, and means for supplying light to said mirror for reflection to the eye under examination, combined with the convex lens to receive the reflected image from the eye to be examined, and a suitable support for said parts; substantially as set forth.

9. The ophthalmoscopic lens having directly secured on its outer face the mirror containing the observation-aperture; substantially as set forth.

Signed at New York, in the county of New York and State of New York, this 13th day of May, A. D. 1901.

ELMER LE ROY RYER.

Witnesses:
CHAS. C. GILL,
GUNDER GUNDERSON.